United States Patent
Baumgartner et al.

(10) Patent No.: US 6,546,429 B1
(45) Date of Patent: Apr. 8, 2003

(54) NON-UNIFORM MEMORY ACCESS (NUMA) DATA PROCESSING SYSTEM THAT HOLDS AND REISSUES REQUESTS AT A TARGET PROCESSING NODE IN RESPONSE TO A RETRY

(75) Inventors: Yoanna Baumgartner, Austin, TX (US); Anna Elman, Austin, TX (US); Glen Douglas Harris, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/157,835

(22) Filed: Sep. 21, 1998

(51) Int. Cl.[7] .......................... G06F 15/16; G06F 15/173
(52) U.S. Cl. .................. 709/253; 709/225; 709/227
(58) Field of Search ........................... 711/122, 141, 711/146, 150; 712/1, 28; 395/800; 709/201, 225, 227, 253; 379/14.01, 32.01, 207.04, 207.05, 207.1, 209.01, 221.03, 221.06; 714/2, 9, 10, 16

(56) References Cited

U.S. PATENT DOCUMENTS

| | | | | |
|---|---|---|---|---|
| 4,125,872 A | * | 11/1978 | Maxwell | 379/40 |
| 5,049,873 A | * | 9/1991 | Robins et al. | 340/825.01 |
| 5,260,986 A | * | 11/1993 | Pershan | 455/413 |
| 5,432,918 A | * | 7/1995 | Stamm | 711/156 |
| 5,483,596 A | * | 1/1996 | Rosenow et al. | 713/167 |
| 5,530,933 A | * | 6/1996 | Frink et al. | 395/468 |
| 5,555,266 A | * | 9/1996 | Buchholz et al. | 370/347 |
| 5,655,077 A | * | 8/1997 | Jones et al. | 713/201 |
| 5,673,413 A | * | 9/1997 | Deshpande et al. | 395/468 |
| 5,689,638 A | * | 11/1997 | Sadovsky | 713/202 |
| 5,796,977 A | * | 8/1998 | Sarangdhar et al. | 709/1 |
| 5,845,117 A | * | 12/1998 | Fujita | 709/107 |
| 5,878,268 A | * | 3/1999 | Hagersten | 395/800 |
| 5,889,958 A | * | 3/1999 | Willens | 709/229 |
| 5,893,144 A | * | 4/1999 | Wood et al. | 711/122 |
| 5,907,610 A | * | 5/1999 | Onweller | 379/242 |
| 5,918,013 A | * | 6/1999 | Mighdoll et al. | 709/217 |
| 5,987,552 A | * | 11/1999 | Chittor et al. | 710/310 |
| 6,012,090 A | * | 1/2000 | Chung et al. | 709/219 |

(List continued on next page.)

OTHER PUBLICATIONS

Lenoski, D. et al., "The directory–based cache coherence protocol for the DASH multiprocessor", Int. Conf. on Computer Architecture, pp. 148–159, 1990.*

Kaufman, J.S., "Blocking in a completely shared resource environment with state dependent resource and residency requirements", INFOCOM, pp. 2224–2232 vol. 3, 1992.*

Hilgeman, J. et al. "Definititions of Managed Objects for SNA Data Link Control (SDLC) using SMlv2", RFC 1747, pp. 1–67, Jan. 1995.*

Dudley, G., "APPN/HPR in IP Networks", RFC 2353, pp. 1–48, May 1998.*

* cited by examiner

Primary Examiner—Zarni Maung
Assistant Examiner—Jason D. Cardone
(74) Attorney, Agent, or Firm—Casimer K. Salys; Bracewell & Patterson, L.L.P.

(57) ABSTRACT

A non-uniform memory access (NUMA) computer system includes at least a local processing node and a remote processing node, with a node controller, that are coupled to a node interconnect. In response to receipt by the node controller of a request transaction transmitted from the local processing node, via the node interconnect, the node controller at the remote processing node issues the request transaction on the local interconnect. If the request transaction receives a retry response at the remote processing node, the node controller reissues the request transaction on the local interconnect at least once, thus giving the request transaction another opportunity to complete successfully.

20 Claims, 7 Drawing Sheets

U.S. PATENT DOCUMENTS

| | | | |
|---|---|---|---|
| 6,061,798 A | * | 5/2000 | Coley et al. ................. 713/201 |
| 6,067,603 A | * | 5/2000 | Carpenter et al. ........... 711/141 |
| 6,067,611 A | * | 5/2000 | Carptender et al. ............ 712/28 |
| 6,081,874 A | * | 6/2000 | Carpenter et al. ........... 711/141 |
| 6,085,293 A | * | 7/2000 | Carpenter et al. ........... 711/141 |
| 6,092,141 A | * | 7/2000 | Lange ........................ 710/310 |
| 6,105,122 A | * | 8/2000 | Muller et al. ................... 712/1 |
| 6,108,764 A | * | 8/2000 | Baumgartner et al. ........ 713/28 |
| 6,178,505 B1 | * | 1/2001 | Schneider et al. ........... 713/168 |
| 6,269,428 B1 | * | 7/2001 | Carpenter et al. ........... 711/150 |
| 6,275,907 B1 | * | 8/2001 | Baumgartner et al. ...... 711/143 |
| 6,311,197 B2 | * | 10/2001 | Mighdoll et al. ............ 707/513 |
| 6,334,177 B1 | * | 12/2001 | Baumgartner et al. ......... 712/13 |
| 6,338,122 B1 | * | 1/2002 | Baumgartner et al. ...... 711/141 |
| 6,339,640 B1 | * | 1/2002 | Chen et al. ............ 379/209.01 |
| 6,374,329 B1 | * | 4/2002 | McKinney et al. ......... 711/141 |
| 6,393,106 B1 | * | 5/2002 | Cannon et al. ............ 379/67.1 |

NON-UNIFORM MEMORY ACCESS (NUMA) DATA PROCESSING SYSTEM THAT HOLDS AND REISSUES REQUESTS AT A TARGET PROCESSING NODE IN RESPONSE TO A RETRY

BACKGROUND OF THE INVENTION

1. Technical Field

The present invention relates in general to a method and system for data processing and, in particular, to data processing within a non-uniform memory access (NUMA) data processing system. Still more particularly, the present invention relates to a NUMA data processing system and method of communication in a NUMA data processing system in which transactions that receive a Retry response at a target processing node are held at the target processing node prior to being returned to the requesting processing node.

2. Description of the Related Art

It is well-known in the computer arts that greater computer system performance can be achieved by harnessing the processing power of multiple individual processors in tandem. Multi-processor (MP) computer systems can be designed with a number of different topologies, of which various ones may be better suited for particular applications depending upon the performance requirements and software environment of each application. One of the most common MP computer topologies is a symmetric multi-processor (SMP) configuration in which multiple processors share common resources, such as a system memory and input/output (I/O) subsystem, which are typically coupled to a shared system interconnect. Such computer systems are said to be symmetric because all processors in an SMP computer system ideally have the same access latency with respect to data stored in the shared system memory.

Although SMP computer systems permit the use of relatively simple inter-processor communication and data sharing methodologies, SMP computer systems have limited scalability. In other words, while performance of a typical SMP computer system can generally be expected to ID improve with scale (i.e., with the addition of more processors), inherent bus, memory, and input/output (I/O) bandwidth limitations prevent significant advantage from being obtained by scaling a SMP beyond a implementation-dependent size at which the utilization of these shared resources is optimized. Thus, the SMP topology itself suffers to a certain extent from bandwidth limitations, especially at the system memory, as the system scale increases. SMP computer systems also do not scale well from the standpoint of manufacturing efficiency. For example, although some components can be optimized for use in both uniprocessor and small-scale SMP computer systems, such components are often inefficient for use in large-scale SMPs. Conversely, components designed for use in large-scale SMPs are impractical for use in smaller systems from a cost standpoint.

As a result, an MP computer system topology known as non-uniform memory access (NUMA) has emerged as an alternative design that addresses many of the limitations of SMP computer systems at the expense of some additional complexity. A typical NUMA computer system includes a number of interconnected nodes that each include one or more processors and a local "system" memory. Such computer systems are said to have a non-uniform memory access because each processor has lower access latency with respect to data stored in the system memory at its local node than with respect to data stored in the system memory at a remote node. NUMA systems can be further classified as either non-coherent or cache coherent, depending upon whether or not data coherency is maintained between caches in different nodes. The complexity of cache coherent NUMA (CC-NUMA) systems is attributable in large measure to the additional communication required for hardware to maintain data coherency not only between the various levels of cache memory and system memory within each node but also between cache and system memories in different nodes. NUMA computer systems do, however, address the scalability limitations of conventional SMP computer systems since each node within a NUMA computer system can be implemented as a smaller SMP system. Thus, the shared components within each node can be optimized for use by only a few processors, while the overall system benefits from the availability of larger scale parallelism while maintaining relatively low latency.

A principal performance concern with CC-NUMA computer systems is the latency associated with communication transactions transmitted via the interconnect coupling the nodes. Because of the relatively high latency associated with request transactions transmitted on the nodal interconnect versus transactions on the local interconnects, it is useful and desirable to reduce unnecessary communication over the nodal interconnect in order to improve overall system performance.

SUMMARY OF THE INVENTION

In accordance with the present invention, a non-uniform memory access (NUMA) computer system includes at least a local processing node and a remote processing node that are each coupled to a node interconnect. The local processing node includes at least a processor and a local system memory, and the remote processing node includes at least a processor having an associated cache memory, a local system memory, and a node controller that are each coupled to a local interconnect. In response to receipt by the node controller of a request transaction transmitted from the local processing node via the node interconnect, the node controller at the remote processing node issues the request transaction on the local interconnect. If the request transaction receives a retry response at the remote processing node, the node controller does not immediately return the retry response to the local processing node. Instead, the node controller reissues the request transaction on the local interconnect at least once, thus giving the request transaction another opportunity to complete successfully. In one embodiment, the request transaction is reissued on the local interconnect of the remote processing node until a response other than retry is received or until a retry limit is reached.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

System Overview

Figure 1:
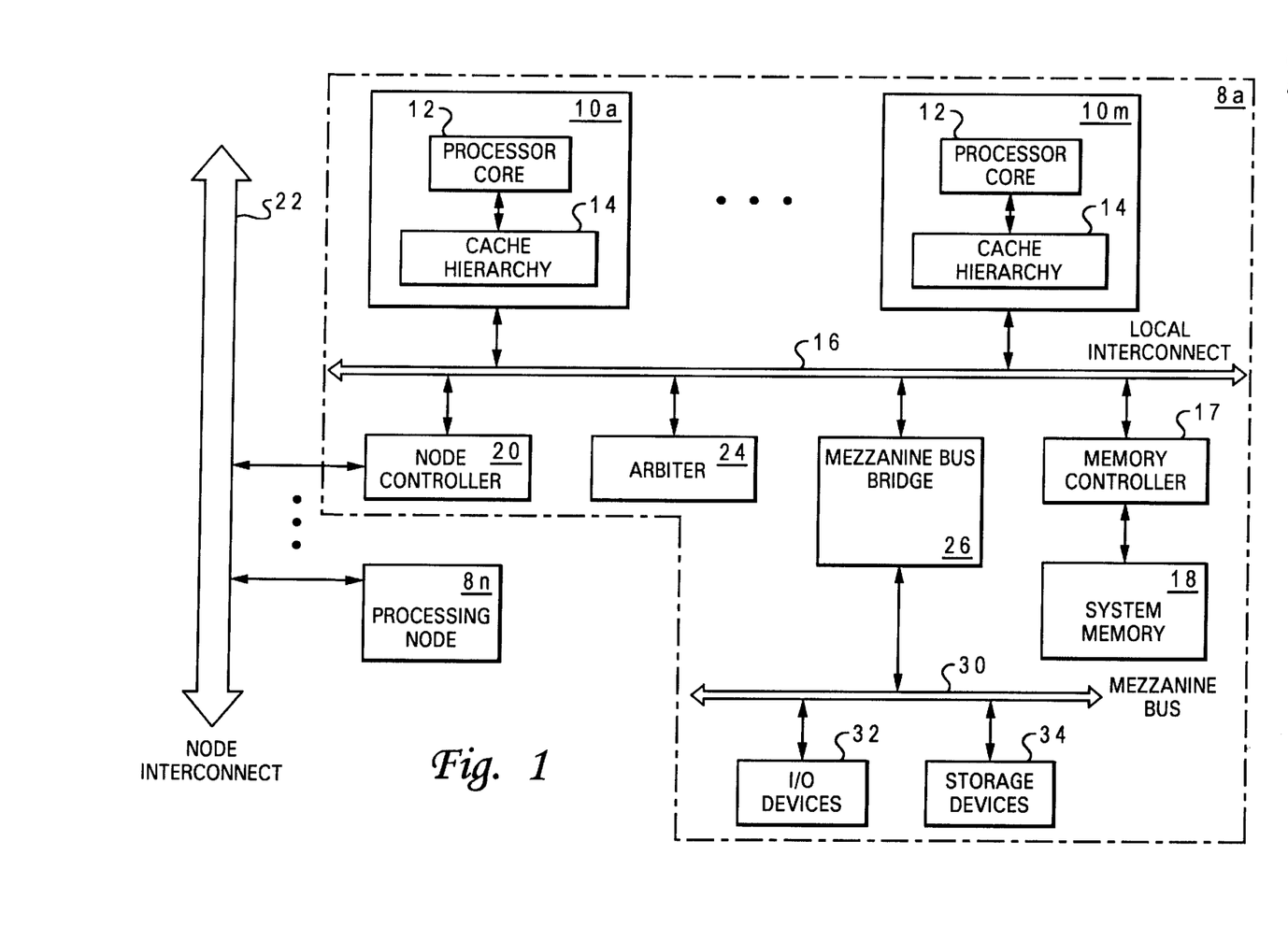
FIG. 1 depicts an illustrative embodiment of a NUMA computer system in accordance with the present invention.

With reference now to the figures and in particular with reference to FIG. 1, there is depicted an illustrative embodiment of a NUMA computer system in accordance with the present invention. The depicted embodiment can be realized, for example, as a workstation, server, or mainframe computer. As illustrated, NUMA computer system 6 includes a number (N≧2) of processing nodes 8a–8n, which are interconnected by node interconnect 22. Processing nodes 8a–8n may each include M (M≧0) processors 10, a local interconnect 16, and a system memory 18 that is accessed via a memory controller 17. Processors 10a–10m are preferably (but not necessarily) identical and may comprise a processor within the PowerPC™ line of processors available from International Business Machines (IBM) Corporation of Armonk, N.Y. In addition to the registers, instruction flow logic and execution units utilized to execute program instructions, which are generally designated as processor core 12, each of processors 10a–10m also includes an on-chip cache hierarchy that is utilized to stage data to the associated processor core 12 from system memories 18. Each cache hierarchy 14 may include, for example, a level one (L1) cache and a level two (L2) cache having storage capacities of between 8–32 kilobytes (kB) and 1–16 megabytes (MB), respectively.

Each of processing nodes 8a–8n further includes a respective node controller 20 coupled between local interconnect 16 and node interconnect 22. Each node controller 20 serves as a local agent for remote processing nodes 8 by performing at least two functions. First, each node controller 20 snoops the associated local interconnect 16 and facilitates the transmission of local communication transactions to remote processing nodes 8. Second, each node controller 20 snoops communication transactions on node interconnect 22 and masters relevant communication transactions on the associated local interconnect 16. Communication on each local interconnect 16 is controlled by an arbiter 24. Arbiters 24 regulate access to local interconnects 16 based on bus request signals generated by processors 10 and compile coherency responses for snooped communication transactions on local interconnects 16, as discussed further below.

Local interconnect 16 is coupled, via mezzanine bus bridge 26, to a mezzanine bus 30, which may be implemented as a Peripheral Component Interconnect (PCI) local bus, for example. Mezzanine bus bridge 26 provides both a low latency path through which processors 10 may directly access devices among I/O devices 32 and storage devices 34 that are mapped to bus memory and/or I/O address spaces and a high bandwidth path through which I/O devices 32 and storage devices 34 may access system memory 18. I/O devices 32 may include, for example, a display device, a keyboard, a graphical pointer, and serial and parallel ports for connection to external networks or attached devices. Storage devices 34, on the other hand, may include optical or magnetic disks that provide non-volatile storage for operating system and application software.

Memory Organization

All of processors 10 in NUMA computer system 6 share a single physical memory space, meaning that each physical address is associated with only a single location in one of system memories 18. Thus, the overall contents of the system memory, which can generally be accessed by any processor 10 in NUMA computer system 6, can be viewed as partitioned between system memories 18. For example, in an illustrative embodiment of the present invention having four processing nodes 8, NUMA computer system may have a 16 gigabyte (GB) physical address space including both a general purpose memory area and a reserved area. The general purpose memory area is divided into 500 MB segments, with each of the four processing nodes 8 being allocated every fourth segment. The reserved area, which may contain approximately 2 GB, includes system control and peripheral memory and I/O areas that are each allocated to a respective one of processing nodes 8.

For purposes of the present discussion, the processing node 8 that stores a particular datum in its system memory 18 is said to be the home node for that datum; conversely, others of processing nodes 8a–8n are said to be remote nodes with respect to the particular datum.

Memory Coherency

Because data stored within each system memory 18 can be requested, accessed, and modified by any processor 10 within NUMA computer system 6, NUMA computer system 6 implements a cache coherence protocol to maintain coherence both between caches in the same processing node and between caches in different processing nodes. Thus, NUMA computer system 6 is properly classified as a CC-NUMA computer system. The cache coherence protocol that is implemented is implementation-dependent and may comprise, for example, the well-known Modified, Exclusive, Shared, Invalid (MESI) protocol or a variant thereof. Hereafter, it will be assumed that cache hierarchies 14 and arbiters 24 implement the conventional MESI protocol, of which node controllers 20 recognize the M, S and I states and consider the E state to be merged into the M state for correctness. That is, node controllers 20 assume that data held exclusively by a remote cache has been modified, whether or not the data has actually been modified.

Interconnect Architecture

Local interconnects 16 and node interconnect 22 is can each be implemented with any bus-based broadcast architecture, switch-based broadcast architecture, or switch-based non-broadcast architecture. However, in a preferred embodiment, at least node interconnect 22 is implemented as a switch-based non-broadcast interconnect governed by the 6xx communication protocol developed by IBM Corporation. Local interconnects 16 and node interconnect 22 permit split transactions, meaning that no fixed timing relationship exists between the address and data tenures comprising a communication transaction and that data packets can be ordered differently than the associated address packets. The utilization of local interconnects 16 and node interconnect 22 is also preferably enhanced by pipelining communication transactions, which permits a subsequent communication transaction to be sourced prior to the master of a previous communication transaction receiving coherency responses from each recipient.

Regardless of the type or types of interconnect architecture that are implemented, at least three types of "packets" (packet being used here generically to refer to a discrete unit of information)—address, data, and coherency response—are utilized to convey information between processing nodes 8 via node interconnect 22 and between snoopers via local interconnects 16. Referring now to Tables I and II, a summary of relevant fields and definitions are given for address and data packets, respectively.

TABLE I

| Field Name | Description |
| --- | --- |
| Address <0:7> | Modifiers defining attributes of a communication transaction for coherency, write thru, and protection |
| Address <8:15> | Tag used to identify all packets within a communication transaction |
| Address <16:63> | Address portion that indicates the physical, virtual or I/O address in a request |
| AParity <0:2> | Indicates parity for address bits <0:63> |
| TDescriptors | Indicate size and type of communication transaction |

TABLE II

| Field Name | Description |
| --- | --- |
| Data <0:127> | Data for read and write transactions |
| Data parity <0:15> | Indicates parity for data lines <0:127> |
| DTag <0:7> | Tag used to match a data packet with an address packet |
| DValid <0:1> | Indicates if valid information is present in Data and DTag fields |

As indicated in Tables I and II, to permit a recipient node or snooper to determine the communication transaction to which each packet belongs, each packet in a communication transaction is identified with a transaction tag. Those skilled in the art will appreciate that additional flow control logic and associated flow control signals may be utilized to regulate the utilization of the finite communication resources.

Within each processing node 8, coherency responses are communicated between each snooper and the local arbiter 24. The signal lines within local interconnects 16 that are utilized for status and coherency communication are summarized below in Table III.

TABLE III

| Signal Name | Description |
| --- | --- |
| AStatOut <0:1> | Encoded signals asserted by each bus receiver to indicate flow control or error information to arbiter |
| AStatIn <0:1> | Encoded signals asserted by arbiter in response to tallying the AStatOut signals asserted by the bus receivers |
| ARespOut <0:2> | Encoded signals asserted by each bus receiver to indicate coherency information to arbiter |
| ARespIn <0:2> | Encoded signals asserted by arbiter in response to tallying the ARespOut signals asserted by the bus receivers |

Status and coherency responses transmitted via the AResp and AStat lines of local interconnects 16 preferably have a fixed but programmable timing relationship with the associated address packets. For example, the AStatOut votes, which provide a preliminary indication of whether or not each snooper has successfully received an address packet transmitted on local interconnect 16, may be required in the second cycle following receipt of the address packet. Arbiter 24 compiles the AStatOut votes and then issues the AStatIn vote a fixed but programmable number of cycles later (e.g., 1 cycle). Possible AStat votes are summarized below in Table IV.

TABLE IV

| AStat vote | Meaning |
| --- | --- |
| Null | Idle |
| Ack | Transaction accepted by snooper |
| Error | Parity error detected in transaction |
| Retry | Retry transaction, usually for flow control |

Following the AStatIn period, the ARespOut votes may then be required a fixed but programmable number of cycles (e.g., 2 cycles) later. Arbiter 24 also compiles the ARespOut votes of each snooper and delivers an ARespIn vote, preferably during the next cycle. The possible AResp votes preferably include the coherency responses listed in Table V.

TABLE V

| Coherency responses | Meaning |
| --- | --- |
| Retry | Source of request must retry transaction -- usually for flow control reasons |
| Modified intervention | Line is modified in cache and will be sourced to requestor |
| Shared | Line is held shared in cache |
| Null | Line is invalid in cache |
| ReRun | Snooped request has long latency and source of request will be instructed to reissue transaction at a later time |

The ReRun AResp vote, which is usually issued by a node controller 20, indicates that the snooped request has a long latency and that the source of the request will be instructed to reissue the transaction at a later time. Thus, in contrast to a Retry AResp vote, a ReRun makes the recipient of a transaction that voted ReRun (and not the originator of the transaction) responsible for causing the communication transaction to be reissued at a later time.

Node Controller

Figure 2:
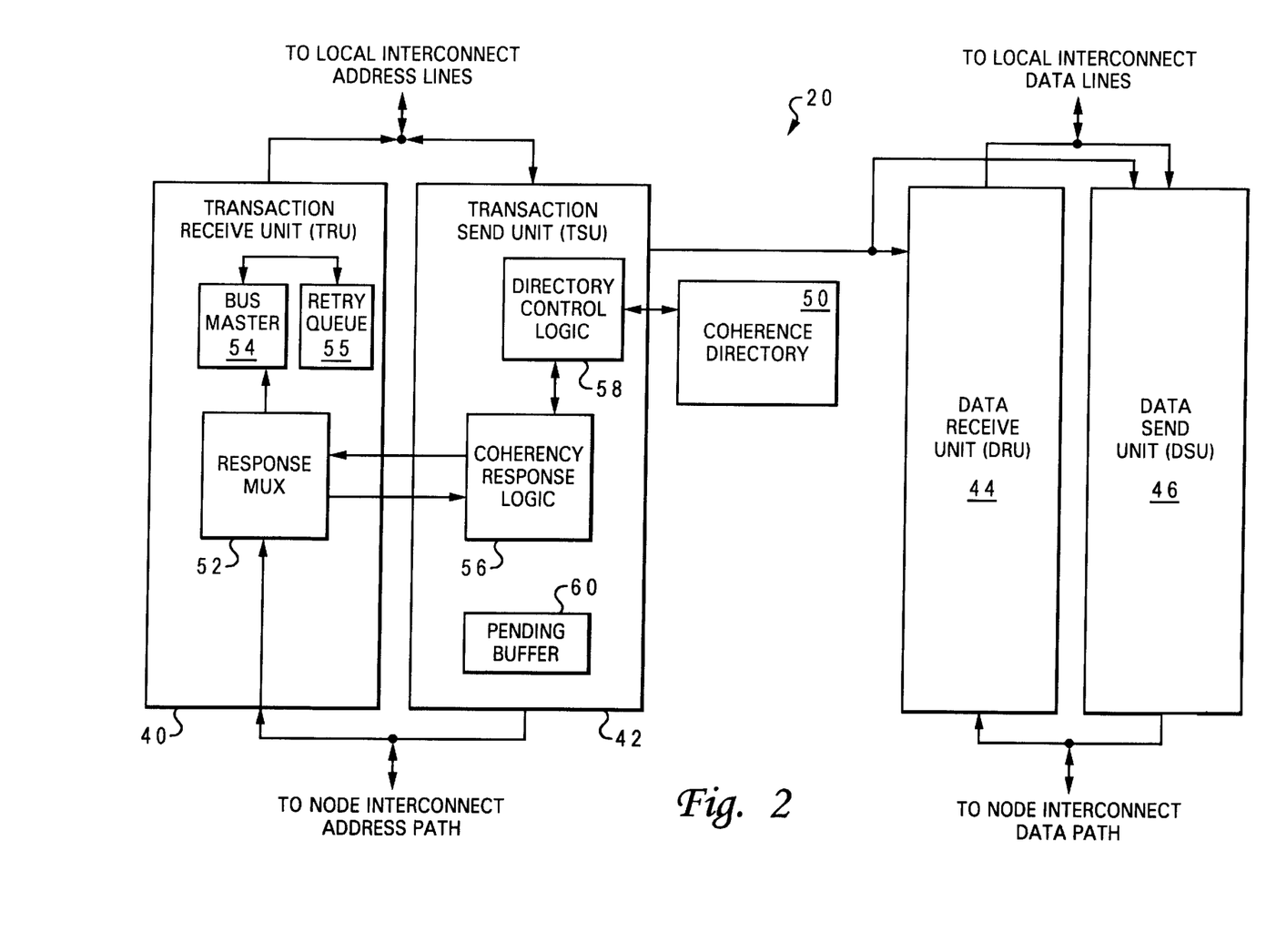
FIG. 2 is a more detailed block diagram of the node controller shown in FIG. 1.

Referring now to FIG. 2, there is illustrated a more detailed block diagram of a node controller 20 in NUMA computer system 6 of FIG. 1. As shown in FIG. 2, each node controller 20, which is coupled between a local interconnect 16 and node interconnect 22, includes a transaction receive unit (TRU) 40, a transaction send unit (TSU) 42, a data receive unit (DRU) 44, and a data send unit (DSU) 46. TRU 40, TSU 42, DRU 44 and DSU 46 can be implemented, for example, with field programmable gate arrays (FPGAs) or application specific integrated circuits (ASICs). As indicated, the address and data paths through node controller 20 are bifurcated, with address (and coherency) packets being processed by TRU 40 and TSU 42 and data packets being processed by DSU 44 and DRU 46.

TRU 40, which is so designated to indicate transaction flow off of node interconnect 22, is responsible for accepting address and coherency packets from node interconnect 22, issuing transactions on local interconnect 16, and forwarding responses to TSU 42. TRU 40 includes response multiplexer (mux) 52, which receives packets from node interconnect 22 and passes selected packets to both bus master 54 and coherency response logic 56 within TSU 42. In response to receipt of a address packet from response multiplexer 52, bus master 54 can initiate a communication transaction on its local interconnect 16 that is the same as or different from the type of communication transaction indicated by the received address packet. As illustrated, in accordance with a preferred embodiment of the present invention, bus master 54 has an associated retry queue 55 in which request transactions sourced on local interconnect 16 are temporarily stored, as discussed further below.

TSU 42, which as indicated by its nomenclature is a conduit for transactions flowing onto node interconnect 22, includes a multiple-entry pending buffer 60 that temporarily stores attributes of communication transactions sourced onto node interconnect 22 that have yet to be completed. The transaction attributes stored in an entry of pending buffer 60 preferably include at least the address (including tag) of the transaction, the type of the transaction, and the number of expected coherency responses. Each pending buffer entry has an associated status, which can be set either to Null, indicating that the pending buffer entry can be deleted, or to ReRun, indicating that the transaction is still pending. In addition to sourcing address packets on node interconnect 22, TSU 42 interacts with TRU 40 to process memory request transactions and issues commands to DRU 44 and DSU 46 to control the transfer of data between local interconnect 16 and node interconnect 22. TSU 42 also implements the selected (i.e., MSI) coherency protocol for node interconnect 22 with coherency response logic 56 and maintains coherence directory 50 with directory control logic 58.

Coherence directory 50 stores indications of the system memory addresses of data (e.g., cache lines) checked out to caches in remote nodes for which the local processing node is the home node. The address indication for each cache line is stored in association with an identifier of each remote processing node having a copy of the cache line and the coherency status of the cache line at each such remote processing node. Possible coherency states for entries in coherency directory 50 are summarized in Table VI.

TABLE VI

| Coherence directory state | Possible state(s) in local cache | Possible state(s) in remote cache | Meaning |
| --- | --- | --- | --- |
| Modified (M) | I | M,E, or I | Cache line may be modified at a remote node with respect to system memory at home node |
| Shared (S) | S or I | S or I | Cache line may be held non-exclusively at remote node |
| Invalid (I) | M,E,S, or I | I | Cache line is not held by any remote node |
| Pending-shared | S or I | S or I | Cache line is in the process of being invalidated at remote nodes |
| Pending modified | I | M,E, or I | Cache line, which may be modified remotely, is in process of being written back to system memory at home node, possibly with invalidation at remote node |

As indicated in Table VI, the knowledge of the coherency states of cache lines held by remote processing nodes is imprecise. This imprecision is due to the fact that a cache line held remotely can make a transition from S to I, from E to I, or from E to M without notifying the node controller 20 of the home node.

Inter-node Communication

Figure 3:
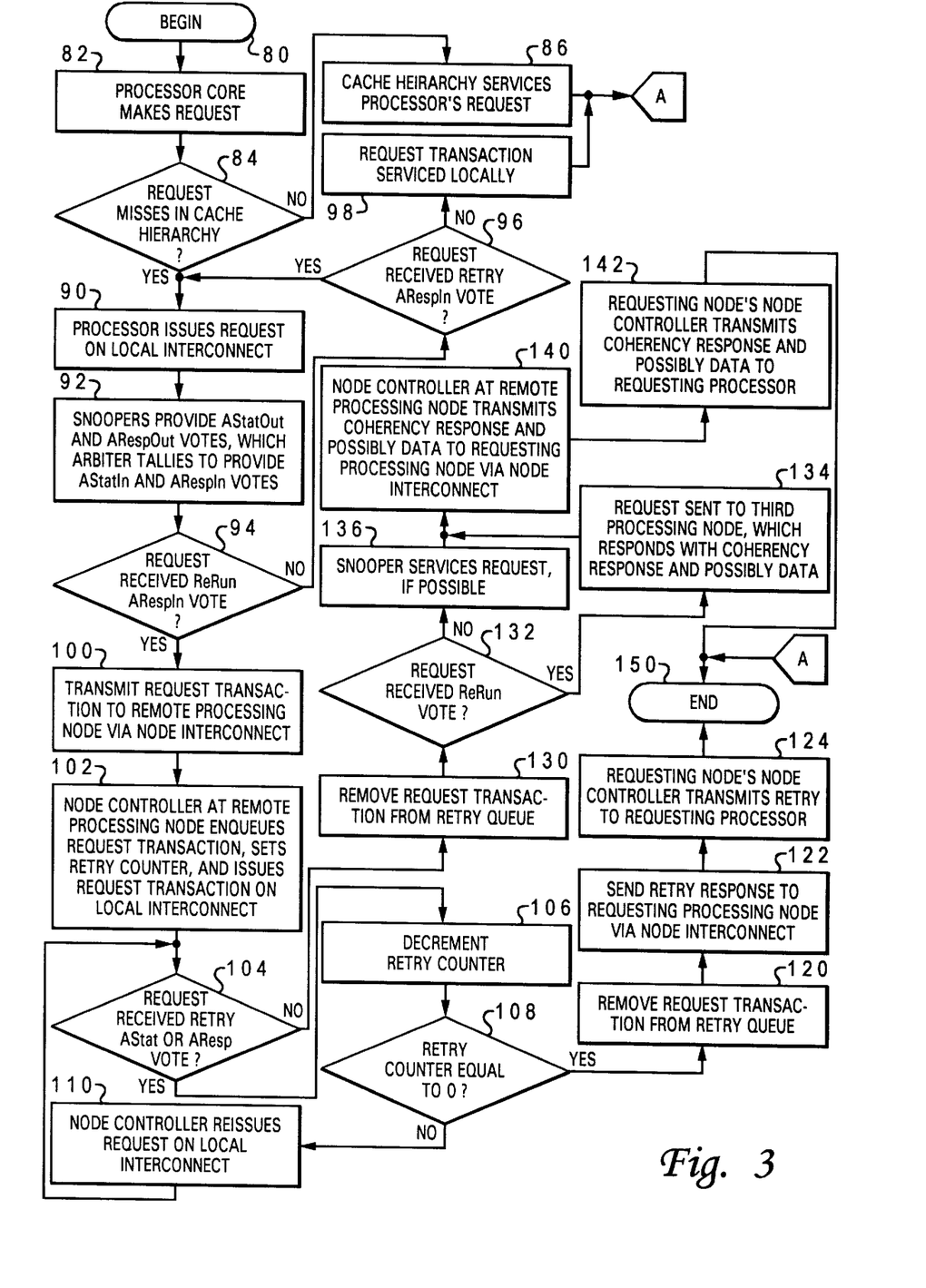
FIG. 3 is a high level logical flowchart of an exemplary method of inter-node communication in accordance with the present invention in which a request that receives a Retry at a remote processing node is held and reissued at the remote processing node.

With reference now to FIG. 3, there is depicted a high level logical flowchart of an illustrative embodiment of a method of inter-node communication of requests within a NUMA computer system in accordance with the present invention. As illustrated, the process begins at block 80 and thereafter proceeds to block 82, which illustrates the processor core 12 of a requesting processor 10 issuing a request (hereinafter it is assumed to be a read request) to its cache hierarchy 14. As illustrated at block 84, cache hierarchy 14 then determines if it can service the read request, that is, if the read request results in a cache hit. If so, the process proceeds to block 86, which illustrates cache hierarchy 14 servicing the read request by supply the requested data to processor core 12. The process then passes through page connector A and terminates at block 150.

Returning to block 84, in response to a determination that the read request missed in cache hierarchy 14, requesting processor 10 issues the read request on its local interconnect 16, as depicted at block 90. In response to snooping the request transaction on local interconnect 16, all snoopers coupled to local interconnect 16 issue AStatOut and ARespOut votes, and arbiter 24 compiles the votes to provide AStatIn and ARespIn votes, as detailed above and as illustrated at block 92.

In order to determine an appropriate ARespOut coherency response to the request transaction for node controller 20, TSU 42 determines if the local processing node 8 is the home node for the requested cache line and, if so, whether coherence directory 50 indicates that the cache line specified by the read request is checked out to a remote processing node 8 in Modified state. If the local processing node 8 is the home node and the requested cache line is checked out to a remote processing node in Modified state, TSU 42 replies to the request transaction on local interconnect 16 with a ARespOut ReRun coherency response. TSU 42 similarly votes ReRun during the ARespOut period if the local processing node 8 is not the home node. Otherwise, TSU 42 votes Null. When arbiter 24 compiles the ARespOut votes to determine the ARespIn vote, Retry will override all other votes, Modified Intervention will override all others besides Retry, ReRun will override Null and Shared (assuming shared intervention is not enabled), and Shared will override Null (and ReRun, if shared intervention is enabled).

If arbiter 24 issues a ARespIn ReRun vote at block 92, the process passes to block 94 and then to block 100, which is described below. Alternatively, if the read request received a Retry AStatIn or ARespIn vote, the process proceeds from block 92 through blocks 94 and 96 and returns to block 90, which illustrates requesting processor 10 reissuing the read request at a later time. If, however, the read request on local interconnect 16 received a Modified Intervention or Shared ARespIn vote (assuming shared intervention is enabled), the process passes from block 92 through blocks 94 and 96 to block 98, which depicts a snooper servicing the read request locally by sourcing the requested cache line to requesting processor 10 via local interconnect 16. Following block 98, the process passes through page connector A and terminates at block 150.

Referring now to block 100, in response to receipt of the ReRun ARespIn vote from arbiter 24, node controller 20 of the requesting processing node 8 issues a request for the requested cache line to a remote processing node 8 (i.e., either the home node or a processing node indicated in coherence directory 50 as holding the requested cache line in Modified state) via node interconnect 22. As depicted at block 102, in response to receipt of the request transaction, node controller 20 of the remote processing node enqueues the request transaction within retry queue 55 in association with an programmable retry count that represents a number of retries for which the request will be held within retry queue 55. Bus master 54 of TRU 40 then issues the request transaction on local interconnect 16 of remote processing node 8. Next, at block 104, TRU 40 of remote processing node 8 determines if the request transaction received a Retry AStatIn or ARespIn vote from the local arbiter 24. If not, the process passes to block 130, which is described below.

However, if the request transaction received a Retry AStatIn or ARespIn vote, the process proceeds to block 106, which illustrates TRU 40 decrementing the retry count associated with the request transaction. If a determination is made at block 108 that the retry count is not equal to zero, meaning that the request transaction has been retried less than a maximum number of times, node controller 20 reissues the request transaction on local interconnect 16 of remote processing node 8, as depicted at block 110. The process then returns to block 104, which has been described. If, however, a determination is made at block 108 that the retry count of the request transaction has reached zero, the request transaction is removed from retry queue 55, as illustrated at block 120. Then, as shown at block 122, TSU 42 of remote processing node 8 transmits the Retry coherency response to requesting processing node 8 via node interconnect 22. The process then proceeds to block 124, which depicts TRU 40 of requesting processing node 8 transmitting the Retry response to requesting processor 10 via local interconnect 16, and thereafter terminates at block 150. Requesting processor 10 may subsequently reissue the request, as described above at block 82. Thus, as shown at blocks 104–124, requests that continue to receive retry responses at a remote processing node 8 are returned to the requesting processing node 8 in order to avoid deadlock conditions. However, because many conditions that cause Retries, such as a full queue within a snooper or a need to write back modified data to the home node, resolve themselves relatively quickly, the Retry response is not immediately returned to requesting processing node 8. Instead, the request transaction is reissued for a certain number of times at remote processing node 8 before the Retry response is returned to requesting processing node 8. In this manner, request transactions that are Retried due to temporary conditions can be serviced more quickly, and the potential for livelocks associated with requests being bounced between processing nodes is reduced.

Returning to block 104, if the request transaction transmitted on local interconnect 16 of remote processing node 8 receives an ARespIn vote other than Retry, the process passes to block 130. Block 130 illustrates TRU 40 of remote processing node 8 removing the request transaction from retry queue 55. If the request transaction received a ReRun ARespIn vote at the remote processing node, meaning that the remote processing node 8 is the home node and that a third node must be involved to service the request, the process passes to block 134, which illustrates node controller 20 of remote processing node 8 transmitting the request transaction to the third processing node 8 via node interconnect 22. The third processing node 8 then services the request, if possible, according to the method illustrated at block 102 and following blocks and transmits the requested data to node controller 20 of remote processing node 8. The process then passes to block 140, which is described below.

Returning to block 132, in response to a determination that the request transaction did not receive a ReRun ARespIn vote, the process passes to block 136, which illustrates a snooper within remote processing node 8 servicing the request transaction, if possible, by sourcing the requested cache line to node controller 20 on local interconnect 16. As illustrated at block 140, node controller 20 of remote processing node 8 then transmits the coherency response received by the request transaction and the requested cache line to requesting processing node 8 via node interconnect 22. As depicted at block 142, node controller 20 of requesting processing node 8 then forwards the coherency response and the requested cache line to requesting processor 10 in a transaction on local interconnect 16. (If requesting processing node 8 is the home node, the requested cache line is written to system memory 18 rather than forwarded to requesting processor 10 if intervention is not enabled.) Thereafter, the process terminates at block 150.

Referring now to FIGS. 4A–4D, an exemplary communication scenario in accordance with the method depicted in FIG. 3 is depicted. FIGS. 4A–4D illustrate simplified views of NUMA computer system 6 from FIG. 1 in order to avoid obscuring the present invention.

Figure 4A:
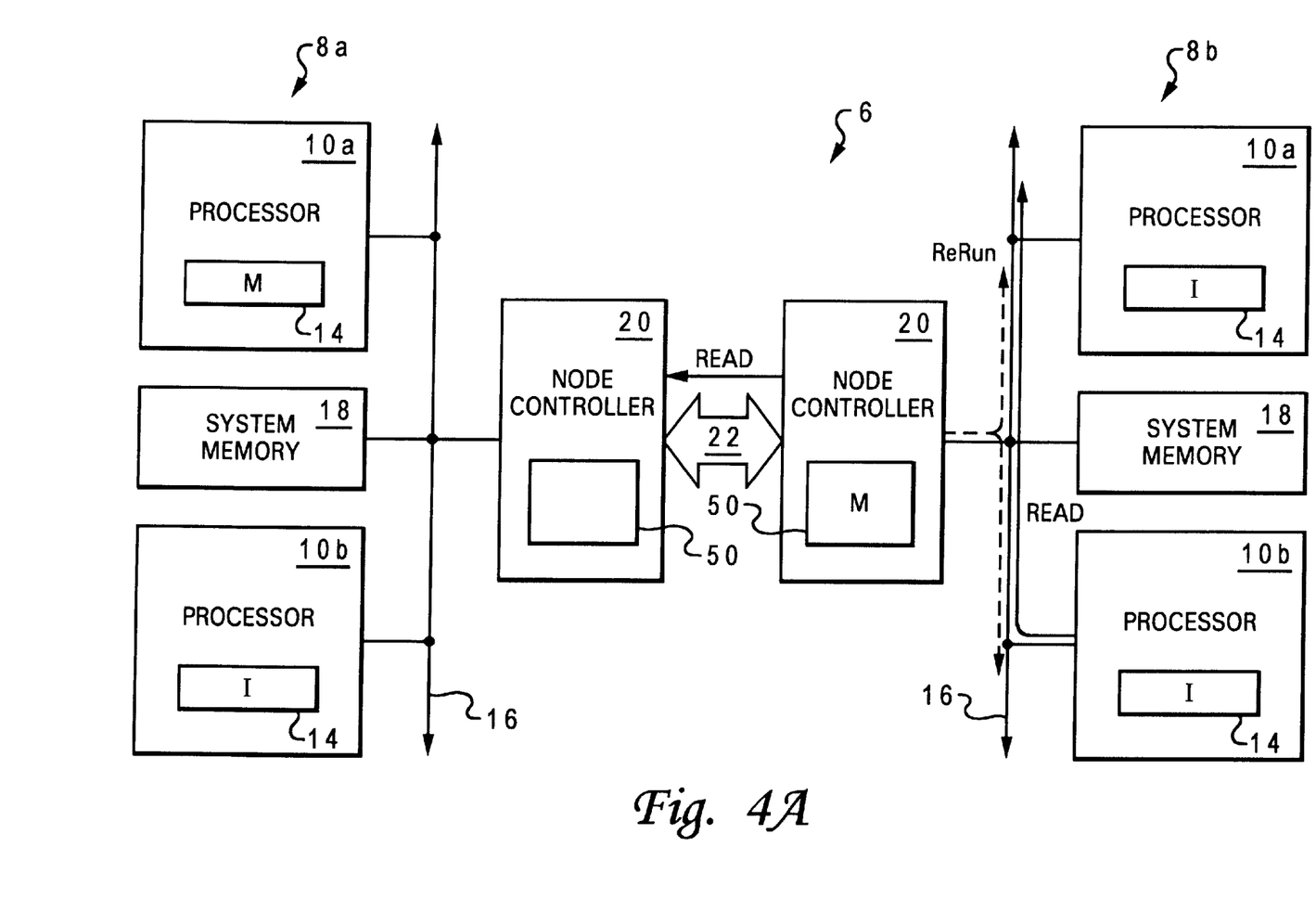
FIGS. 4A–4D together illustrate an exemplary processing scenario in accordance with the method depicted in FIG. 3.

Referring first to FIG. 4A, during operation of NUMA computer system 6, processor 10*b* of processing node 8*b* requests a cache line not resident in its cache hierarchy 14. In the present example, the requested cache line has processing node 8*b* as its home node. In response to a miss in its cache hierarchy 14, processor 10*b* issues a read request on interconnect 16 specifying the requested cache line. In response to receipt of the read request, processor 10*a* votes Null during the ARespOut period, and node controller 20 of processing node 8*b* votes ReRun because coherence directory 50 indicates that the requested cache line is Modified at processing node 8*a*. The arbiter compiles these ARespOut votes and issues a ReRun ARespIn vote. In response to the ReRun ARespIn vote, node controller 20 of processing node 8*b* transmits the read request to node controller 20 of processing node 8*a* via node interconnect 22.

Figure 4B:
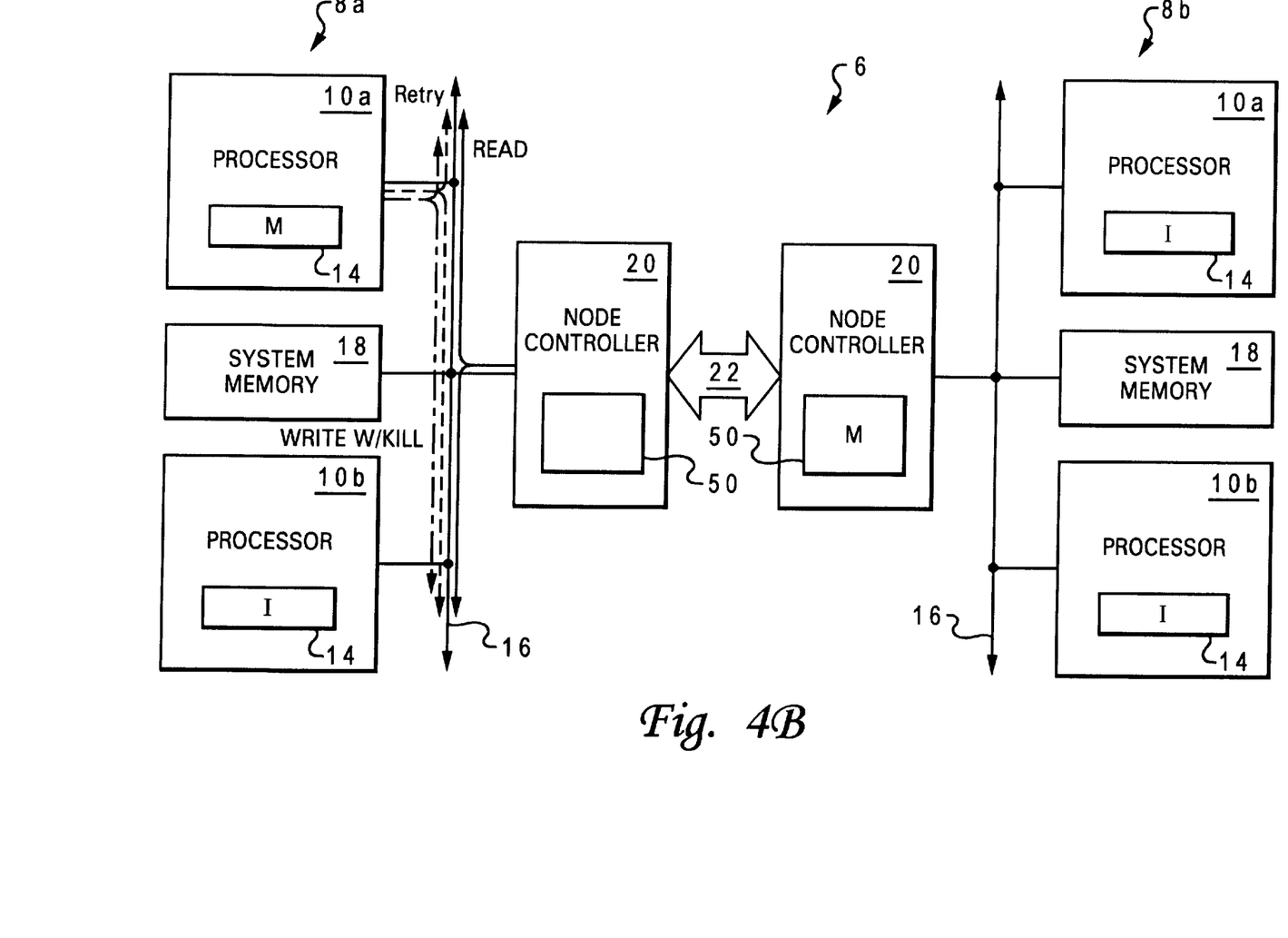

As shown in FIG. 4B, following receipt of the read request, node controller 20 of processing node 8*a* issues the read request on its local interconnect 16. As indicated, the requested cache line is held in Modified state by cache hierarchy 14 of processor 10*a* and is Invalid (i.e., not resident) in cache hierarchy 14 of processor 10*b*. In response to snooping the read request, processor 10*b* of processing node 8*a* votes Null during the ARespOut period, and, because intervention is not enabled, processor 10*a* votes Retry. Processor 10*a* also issues a write with kill transaction containing the requested cache line on local interconnect 16. In other words, processor 10*a* initiates the write back of the requested cache line to system memory 18 of processing node 8*b* before the read request is permitted to complete successfully at processing node 8*a*.

Figure 4C:
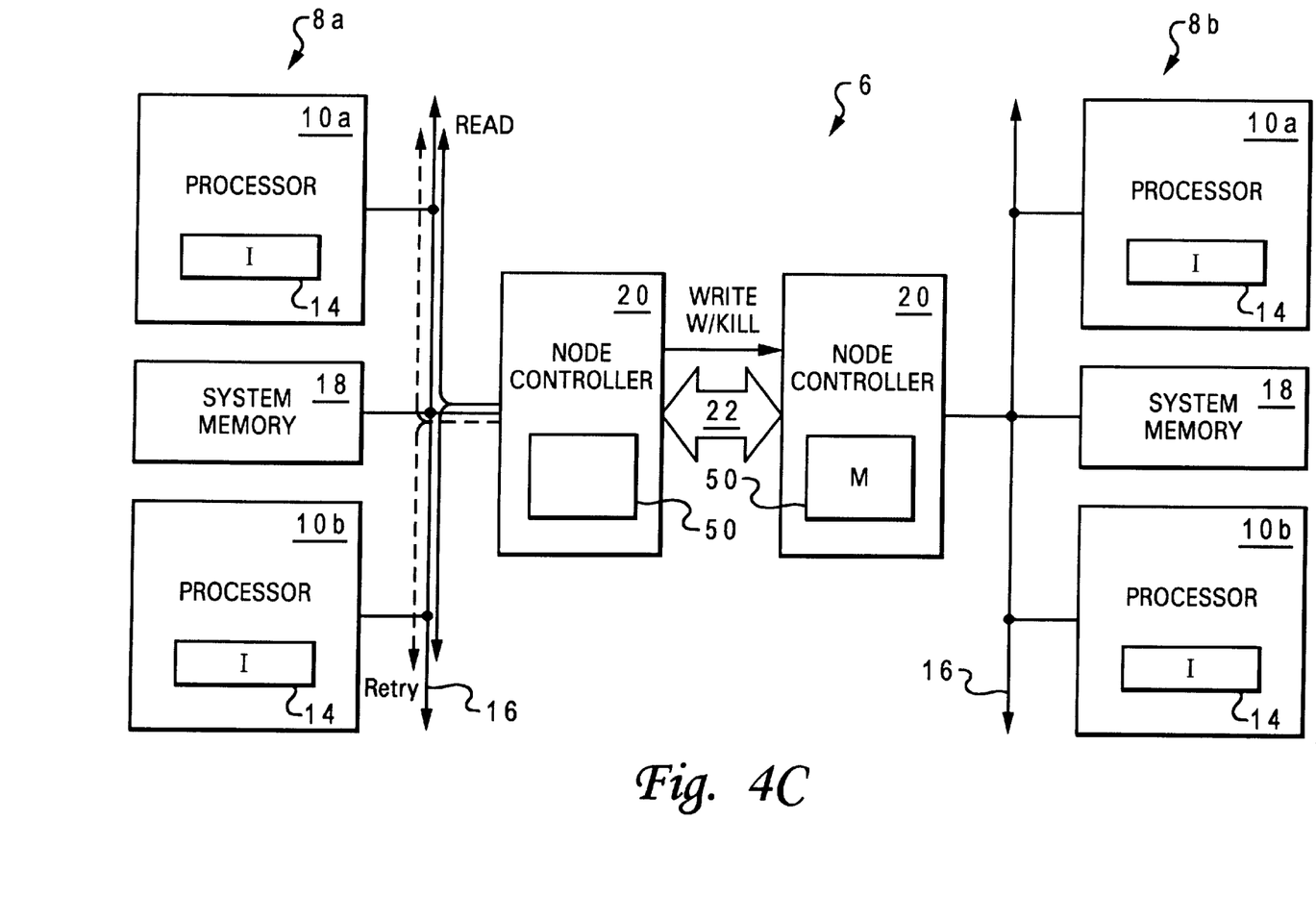

With reference now to FIG. 4C, during the interval between processor 10*b* of processing node 8*a* issuing the write with kill transaction and node controller 20 issuing the write with kill transaction on node interconnect 22, TRU 40 of node controller 20 will continue to reissue the read request on local interconnect 16 of processing node 8*a* until the retry count for the read request is decremented to zero. In response to snooping the read request, processors 10*a* and 10*b* vote Null during the ARespOut period, and node controller 20 votes Retry until the write with kill operation is issued on node interconnect 22.

Figure 4D:
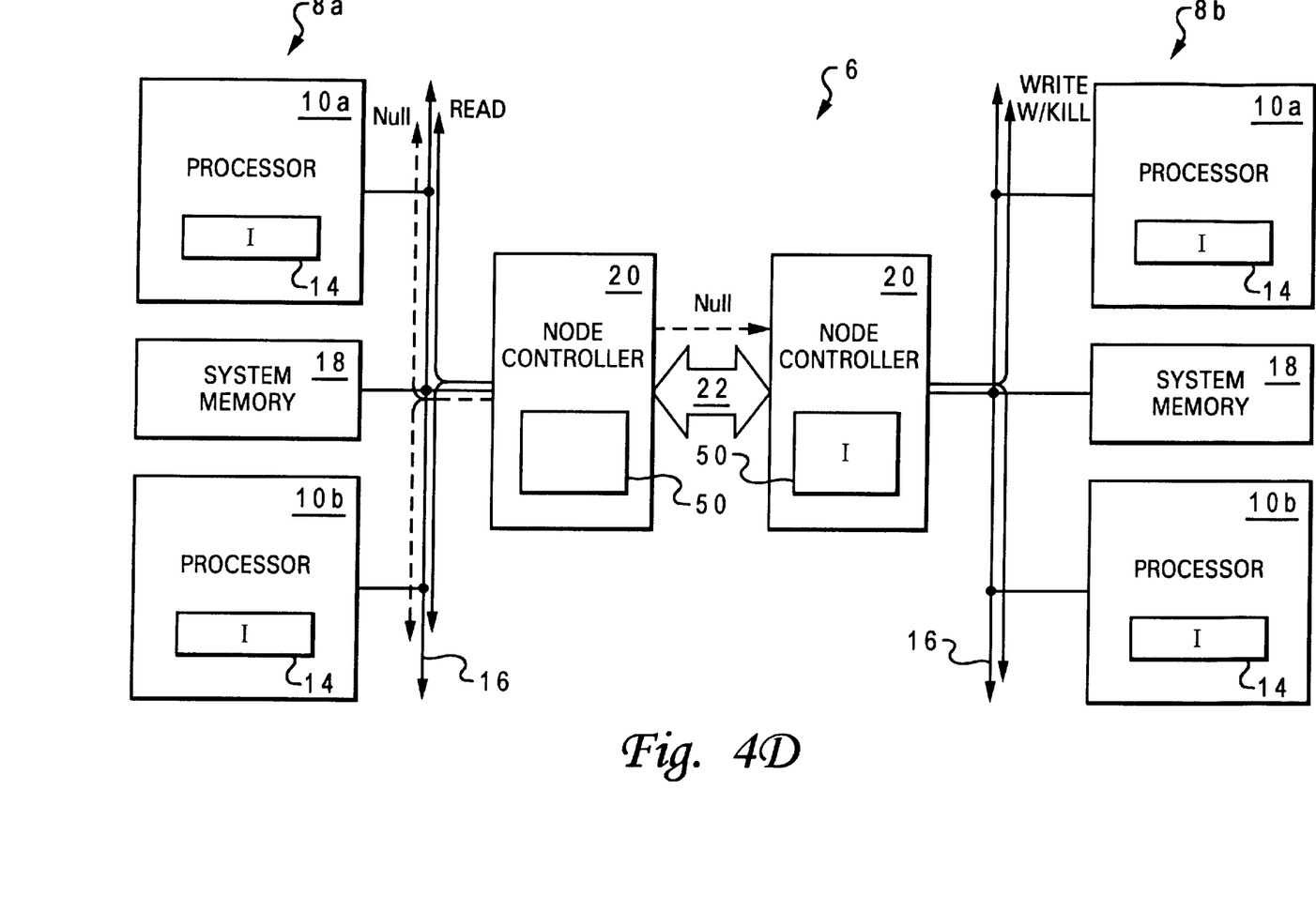

As shown in FIG. 4D, when node controller 20 reissues the read request on node interconnect 16 of processing node 8*a* after node controller 20 has issued the write with kill transaction on node interconnect 22, all of the snoopers within processing node 8*a* will vote Null during the ARespOut period. Meanwhile, node controller 20 of processing node 8b updates system memory 18 at processing node 8b with the modified cache line by issuing the write with kill transaction on local interconnect 16. Thus, when the Null coherency response received by the read request at processing node 8a is returned to processor 10b of processing node 8b, processor 10b reissues the read request on local interconnect 16, and the read request is serviced by local system memory 18. In this manner, servicing the read request entails only a single transmission of the read request over node interconnect 22 despite the fact that the read request was Retried at the remote processing node.

As has been described, the present invention provides an improved method and system for inter-node communication in a NUMA computer system. In accordance with the present invention, request transactions that are transmitted to remote processing nodes, issued on the remote processing node's local interconnect, and then Retried are held at the remote processing node and reissued at least once prior to returning a coherency response to the requesting processing node. In this manner, deadlock and livelock conditions are avoided, and request transactions are serviced in a timely manner while minimizing communication over the node interconnect.

While the invention has been particularly shown and described with reference to a preferred embodiment, it will be understood by those skilled in the art that various changes in form and detail may be made therein without departing from the spirit and scope of the invention. For example, while the present invention has been described with reference to an exemplary processing scenario in which a read request is transmitted between processing nodes, it should be understood that the exemplary method described above with respect to FIG. 3 is equally applicable to other request transactions, including without limitation read-with-intent-to-modify (RWITM) requests and cache operation requests such as flushes. In cases in which the queued request transaction has associated data, the data may similarly be queued in DRU 44 and accessed by transaction tag. Furthermore, while an illustrative embodiment of the present invention reissues a retried request transaction a certain number of times, it should be understood that other conditions could be utilized to limit the number of times that the request transaction is reissued before the Retry response is returned to the requesting processing node. For example, retry queue 55 could alternatively store the request transaction in association with a timestamp and reissue the request transaction until a predetermined interval had elapsed since the timestamp was recorded.

What is claimed is:

1. A method for communicating request transactions in a computer system having a plurality of processing nodes coupled by a node interconnect, said plurality of processing nodes including a local processing node and a remote processing node, said method comprising:

in response to receipt at said remote processing node of a request transaction transmitted from said local processing node via said node interconnect, said request transaction requesting access to a cacheable data granule, node controller hardware in said remote processing node issuing said request transaction on a local interconnect within said remote processing node;

a plurality of snoopers within said remote processing node providing individual responses to said request transaction based upon cache coherency states associated with said data granule at said plurality of snoopers; and said node controller hardware managing said request transaction in said remote processing node, said managing including in response to said request transaction receiving a retry snoop response at said remote processing node, said node controller hardware reissuing said request transaction on said local interconnect of said remote processing node at least once until a response other than retry is received or until a limit is reached prior to providing to said local processing node a response of said remote processing node to said request transactions.

2. The method of claim 1, said request transaction specifying data, said method further comprising transmitting said request transaction to said remote processing node in response to an indication at said local processing node that said specified data is modified at said remote processing node.

3. The method of claim 1, wherein said limit is a maximum number of times to reissue said request transaction determined by a retry count.

4. The method of claim 1, wherein said limit is a time limit.

5. The method of claim 1, said node controller hardware thereafter transmitting a final response to said local processing node.

6. The method of claim 1, wherein said request transaction is a read request, said method further comprising said node controller hardware transmitting data specified in said read request from said remote processing node to said local processing node via said node interconnect.

7. The method of claim 1, and further comprising said node controller hardware enqueuing said request transaction at said remote processing node.

8. A computer system, comprising:

a node interconnect; and a plurality of processing nodes coupled to said node interconnect, wherein said plurality of processing nodes include at least a local processing node and a remote processing node, said local processing node including a processor and a local system memory and said remote processing node including:

a local interconnect;

a plurality of snoopers each having a respective associated cache memory, a local system memory, and node controller hardware that are all coupled to the local interconnect, wherein:

said node controller hardware, responsive to receipt by said node controller of a request transaction transmitted from said local processing node via said node interconnect, said request transaction requesting access to a cacheable data granule, issues said request transaction on said local interconnect of said remote processing node; and said plurality of snoopers provide individual snoop responses to said request transaction based upon cache coherency states associated with said data granule at said plurality of snoopers; and said node controller hardware, responsive to said request transaction receiving a retry snoop response at said remote processing node, manages said request by reissuing said request transaction on said local interconnect at least once until a response other than retry is received or until a limit is reached prior to providing to said local processing node a response of said remote processing node to said request transaction.

9. The computer system of claim 8, wherein said request transaction specifies data, said local processing node further comprising a directory that stores indications of coherency states of data from said system memory in said local processing node that are stored at said remote processing node, wherein said local processing node transmits said request transaction to said remote processing node in response to an indication at said local processing node that said specified data is modified at said remote processing node.

10. The computer system of claim 8, wherein said limit is a maxim number of times to reissue said request transaction determined by a retry count.

11. The computer system of claim 8, wherein said limit is a time limit.

12. The computer system of claim 8, wherein said node controller hardware transmits a final response to said request transaction at said remote processing node to said local processing node.

13. The computer system of claim 8, wherein said request transaction is a read request, and wherein said node controller hardware transmits data specified in said read request from said remote processing node to said local processing node via said node interconnect.

14. The computer system of claim 8, said node controller hardware including a retry queue in which said request transaction is enqueued.

15. A computer system node, comprising:
 a local interconnect;
 a plurality of snoopers coupled to the local interconnect, each having a respective associated cache memory; and
 node controller hardware, coupled to the local interconnect, that includes an interface to a node interconnect, wherein:
  said node controller hardware, responsive to receipt by said node controller hardware of a request transaction transmitted from a remote processing node via said node interconnect, said request transaction requesting access to a cacheable data granule, issues said request transaction on said local interconnect;
  said plurality of snoopers provide individual snoop responses to said request transaction based upon cache coherency states associated with said data granule at said plurality of snoopers; and
  said node controller hardware, responsive to said request transaction receiving a retry snoop response from said at least one snooper, manages said request by reissuing said request transaction on said local interconnect at least once until a response other than retry is received or until a limit is reached prior to providing to said remote processing node a response to said request transaction.

16. The computer system node of claim 15, wherein said limit is a maximum number of times to reissue said request transaction determined by a retry count.

17. The computer system node of claim 15, wherein said limit is a time limit.

18. The computer system node of claim 15, wherein said node controller hardware transmits a final response to said request transaction to said remote processing node.

19. The computer system node of claim 15, wherein said request transaction is a read request, and wherein said node controller hardware transmits data specified in said read request to said remote processing node via said node interconnect.

20. The computer system node of claim 15, said node controller hardware including a retry queue in which said request transaction is enqueued.

* * * * *